United States Patent [19]
Taylor

[11] Patent Number: 5,750,971
[45] Date of Patent: *May 12, 1998

[54] APPARATUS FOR CONTROLLING RF GENERATORS TO WELD PLASTIC MATERIALS

[75] Inventor: Junius E. Taylor, Phoenix, Ariz.

[73] Assignee: Engineering & Research Associates, Inc., Tucson, Ariz.

[*] Notice: The term of this patent shall not extend beyond the expiration date of Pat. No. 5,349,166.

[21] Appl. No.: 687,252

[22] Filed: Jul. 25, 1996

Related U.S. Application Data

[63] Continuation of Ser. No. 306,991, Sep. 16, 1994, Pat. No. 5,543,604, which is a continuation of Ser. No. 785,405, Oct. 31, 1991, Pat. No. 5,349,166.

[51] Int. Cl.$^6$ .............................. H05B 6/54; H05B 9/04; B32B 19/02
[52] U.S. Cl. .................. 219/769; 219/643; 219/777; 219/778; 323/273
[58] Field of Search .................... 218/643, 607, 218/635, 642, 660, 663, 664, 769, 777, 780; 323/273, 349; 156/203, 272.2, 272.3, 272.4, 380.2, 380.4

[56] References Cited

U.S. PATENT DOCUMENTS

| | | | |
|---|---|---|---|
| 4,013,860 | 3/1977 | Hosterman et al. | 219/10.81 |
| 4,186,292 | 1/1980 | Acker | 219/10.81 |
| 4,390,832 | 6/1983 | Taylor | 323/273 |
| 4,488,028 | 12/1984 | Acker et al. | 219/10.81 |
| 4,490,598 | 12/1984 | Minney et al. | 219/10.81 |
| 4,491,711 | 1/1985 | Acker | 219/10.81 |
| 4,496,819 | 1/1985 | Acker et al. | 219/10.81 |
| 5,349,166 | 9/1994 | Taylor | 219/643 |
| 5,543,604 | 8/1996 | Taylor | 219/643 |

*Primary Examiner*—Tu B. Hoang
*Attorney, Agent, or Firm*—Cahill, Sutton & Thomas P.L.C.

[57] ABSTRACT

Radio frequency power for melting, sealing and welding plastic tubing compressed between a pair of manually or automatically actuated electrically conducting jaws of a hand held or fixed base tubing sealer is regulated by a pulse width modulator controlling the duty cycle of applied constant voltage pulses. A predetermined change of impedance of the tubing during compression and melting is detected to regulate the power applied and to ensure a weld of predetermined physical parameters. On completion of the weld, a first timer is reset and a further weld may be made. In the event of impedance mismatch, a second timer inhibits further application of power and resetting of the first timer. The use of the pulse width modulator enhances conservation of power and accommodates portability of the tubing sealer through use of rechargeable batteries as the power source.

10 Claims, 9 Drawing Sheets

WHERE: $t_1$ IS INITIAL TURN ON $t_2$ TUBING MELTS AND JAWS BEGIN RAPID CLOSURE $t_3$ END OF SEAL

RF GENERATOR RELATIVE OUTPUT VOLTAGE DURING THE SEAL EXECUTION

SAME WAVESHAPE HOLDS FOR BOTH SMALL AND LARGE TUBING

PURE FALL TIME IS DECREASED TO ARBITRARY VALUE BY THE PROPER SELECTION OF R62 AND R63

MODIFIED WAVEFORM

WAVEFORM MODIFIER CIRCUIT

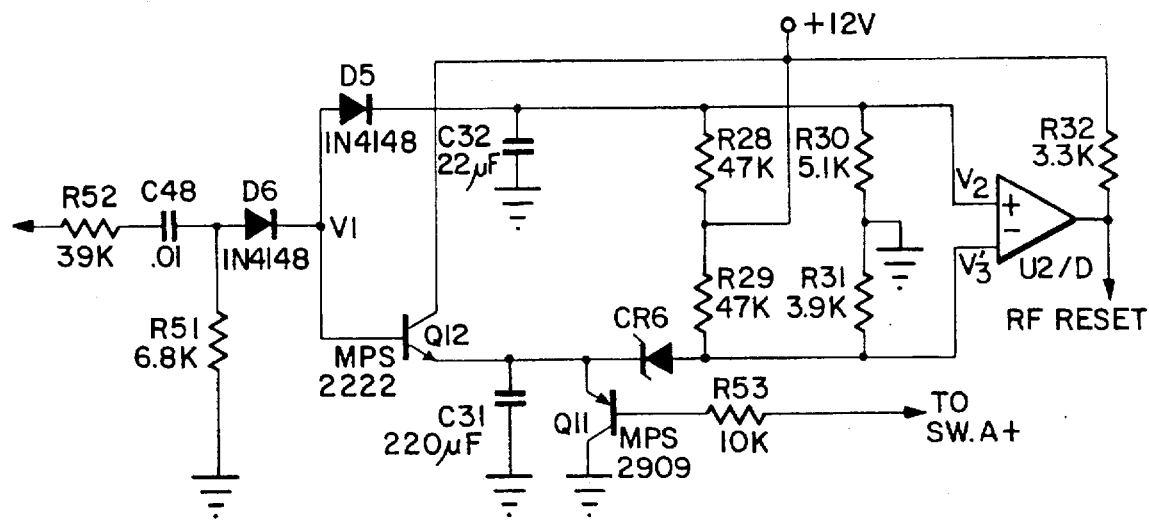
END OF SEAL DETECTOR  Fig. 9
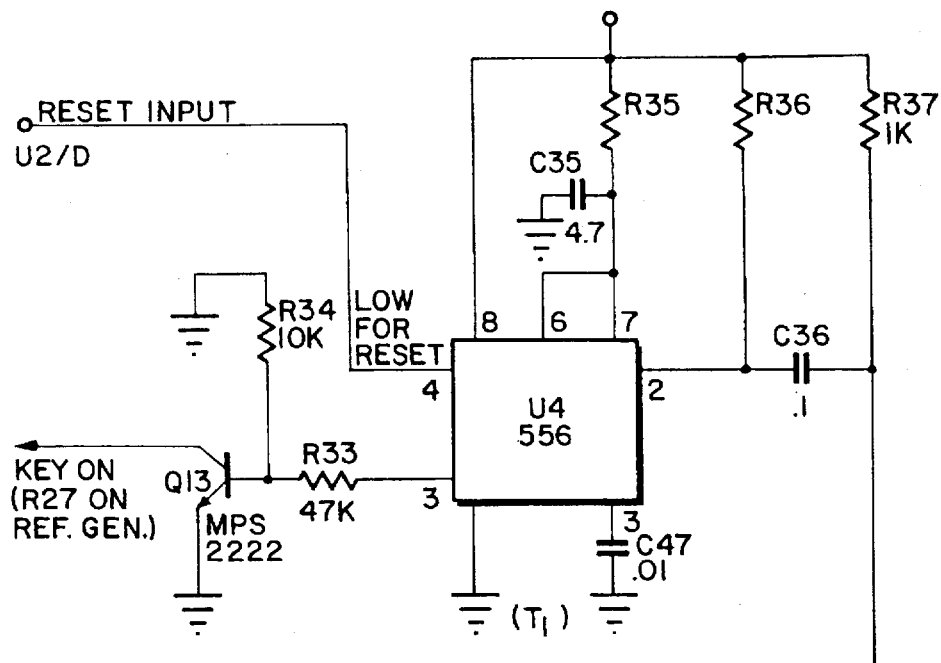
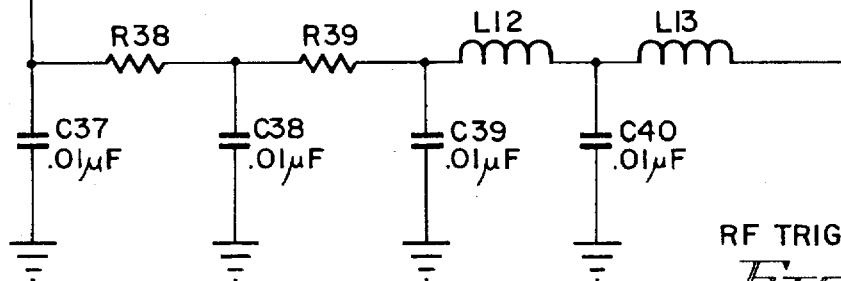
RF TRIGGER/RESET  Fig. 10

APPARATUS FOR CONTROLLING RF GENERATORS TO WELD PLASTIC MATERIALS

CROSS-REFERENCE TO RELATED APPLICATION

This application is a continuation application of a pending application entitled "RF GENERATOR FOR PLASTIC TUBING SEALERS", assigned Ser. No. 08/306,991 filed Sep. 16, 1994, now U.S. Pat. No. 5,543,604 to be issued on Aug. 6, 1996, which application is a continuation application of an application entitled "RF GENERATOR FOR PLASTIC TUBING SEALERS", assigned Ser. No. 07/785,405, filed Oct. 31, 1991, now U.S. Pat. No. 5,349,166.

BACKGROUND OF THE INVENTION

1. Field of the Invention

The present invention relates to tubing sealers and, more particularly, to a radio frequency generator for generating radio frequency power to melt and weld a seal across plastic tubing.

2. Description of Related Art

There is a continual existing need for blood donors in order to meet the day to day hospital demand for blood. Consequently, many private organizations, whether or not affiliated with hospitals, have arisen for the sole purpose of collecting blood. In order to obtain sufficient quantities of blood, these organizations must visit locations having a high concentration of blood donors. Schools, office buildings, factories and the like are prime candidates for a high density of blood donors. To effect collection, all the equipment necessary to collect the donated blood must be transported to the location. This places a premium on portability and ease of use of the equipment.

Normally, the blood is drawn from a donor through flexible tubing extending into a plastic blood collection bag. Once the bag is filled to its capacity, the tubing must be sealed to prevent leakage and, more importantly, prevent contamination and deterioration of the collected blood. After collection, the blood must be typed and tested under various criteria. To provide a representative supply of blood for these typing and test purposes, a plurality of segments of the tubing are sealed from one another to provide a plurality of segregable sealed samples which are opened only for typing and testing purposes.

Because of the required mobility and rapid blood collection procedures, any and all equipment used must be specifically designed for compact storage, minimum reliance upon support facilities at the blood collection location, minimum operating and setup times and ease of operability. A hand held sealer suitable for this purpose is described in U.S. Pat. No. 4,013,860, which patent is assigned to the present assignee. It discloses a hand operated sealer having a pair of jaws for compressing the tubing while simultaneously applying radio frequency energy to melt the tubing and form a weld thereacross to effect a seal. The described hand sealer is portable and has been successfully used throughout the world for many years. U.S. Pat. No. 4,186,292, assigned to the present assignee, describes a tubing sealer usable at a fixed location to perform seals commensurate with requirements of a production line. U.S. Pat. No. 4,496,819, assigned to the present assignee, describes various configurations of jaws usable in a hand held or a fixed based sealer for the purpose of applying radio frequency energy across a length of tubing to be welded. U.S. Pat. No. 4,490,598, assigned to the present assignee, describes a sealer usable at a fixed location for effecting a plurality of seals in a length of blood collection tubing. The teachings and details set forth in these patents are incorporated herein by reference.

SUMMARY OF THE INVENTION

Plastic tubing is placed between and is compressed by a pair of movable jaws of a sealing head embodied in a tubing sealer. On movement of the jaws, an electrical switch is actuated to start a timer having a preset time constant and a radio frequency generator is actuated to transmit radio frequency energy across the jaws and through the tubing to heat and melt the tubing. The force of the jaws compresses the tubing and the impedance presented by the tubing jaws changes as the tubing is heated and compressed in accordance with a predetermined range of values from inductive to resistive to capacitive. A pulse width modulating circuit controls and regulates the average power output of the radio frequency generator by varying the duty cycle while the peak power amplitude is maintained constant. An end of seal detector senses an impedance commensurate with a predetermined state of melt and compression of the tubing to terminate operation of the radio frequency generator. In the event the predetermined impedance variation is not presented by the compressed tubing due to fault of some type or if completion of the seal is not sensed prior to the preset time period of the timer, a latching network may be incorporated to inhibit further operation. An arc sensing circuit may be employed to terminate operation of the radio frequency generator in the event of arcing between the pair of jaws. The use of rechargeable batteries in combination with power depletion indicating circuitry permits portability of the sealer.

It is therefore a primary object of the present invention to provide a constant voltage amplitude time dependent variable average power level radio frequency generator for sealing tubing placed intermediate a pair of tubing compressing jaws.

Another object of the present invention is to provide apparatus for regulating the power output of a radio frequency generator as a function of the varying impedance between a pair of jaws compressing plastic tubing to be melted and sealed.

Yet another object of the present invention is to provide apparatus for detecting completion of a seal created by a pair of jaws compressing plastic tubing placed therebetween simultaneous with application of radio frequency energy to melt the plastic tubing.

Still another object of the present invention is to provide a low power consumption constant voltage amplitude power output circuit for generating and applying radio frequency energy across plastic material to be melted.

A further object of the present invention is to provide a fault detection circuit based upon impedance matching during the heating and melting of plastic material compressed between a pair of electrically conductive jaws transmitting radio frequency energy thereacross.

A still further object of the present invention is to provide a radio frequency generator powered by a low voltage DC power source for use with a plastic tubing sealer to form a weld across the tubing.

A still further object of the present invention is to provide a method for generating a time variable constant power level radio frequency energy to melt and weld plastic tubing as a function of the degree of compression and melt of the tubing.

A still further object of the present invention is to provide a method for sensing completion of a weld across plastic tubing resulting from transmission of radio frequency energy transmitted between a pair of movable jaws compressing the tubing.

These and other objects of the present invention will become apparent to those skilled in the art as the description there proceeds.

BRIEF DESCRIPTION OF THE DRAWINGS

The present invention will be described with greater specificity and clarity with reference to the following drawings, in which:

FIG. 9 illustrates the circuit for the end of seal detector;

FIG. 10 illustrates the radio frequency trigger and reset circuitry;

DESCRIPTION OF THE PREFERRED EMBODIMENT

Figure 1A:
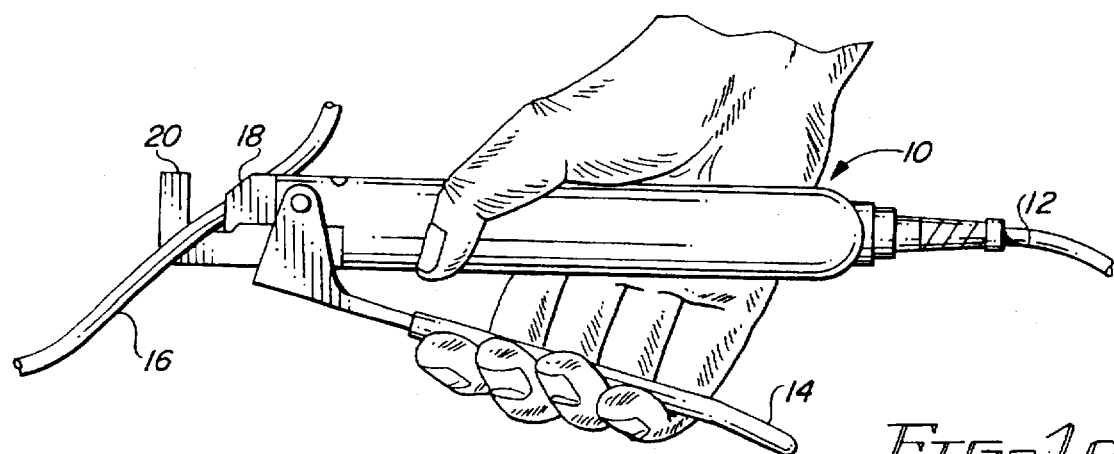
FIGS. 1a, 1b and 1c illustrate a representative hand held sealer for receiving, compressing, welding and releasing plastic tubing.

The circuit and mechanisms to be described provide several practical and significant advances in the field of heating and welding plastic materials, particularly plastic tubing. The duration of any operation or procedure, whether in the field or on an assembly line is always of significance. The circuit described herein applies a relatively substantial quantity of RF energy, which may be variably settable output power level, for a minimal length of time to specifically melt the plastic just sufficiently to form a weld. With respect to a particular type of tubing widely used in conjunction with blood collection bags, this time period is between ½ second to 2 seconds.

Power consumption is generally of minimal concern when the power source is a conventional source of 110/220 volt alternating current, but when the power source is a rechargeable battery, minimal power consumption per seal/weld becomes of paramount importance. The circuit to be described operates in a low current drain standby mode except for the very brief duration when a seal or weld is actually being made. To enhance minimizing power consumption, a pulse width modulator is used to vary the duration of applied full voltage pulses to achieve an average power level appropriate for the plastic and type of weld being made. The resulting efficiency achieved increases the number of welds possible from a given power supply by 50% to 100%.

The generation of heat in any plastic sealer or welder has always been a problem. Because the heat tends to build, heat sinks have been previously required to dissipate the heat and prevent heat buildup beyond an acceptable level. By applying high power level RF energy for a relatively brief time and turning it off once melting is sensed, several advantages are achieved. When tubing containing blood is to be sealed, heating of the tubing for an extended period of time causes heating of the tubing other than only at the point where the weld or seal is to be made. The heat will be transmitted by conduction to the contained blood and red cell homolysis (rupture) will often occur. This may render the blood sample useless for its intended purpose. This danger is ameliorated if not eliminated by minimizing the time of heating of the plastic tubing and removing the heat source as quickly as possible to prevent conduction of heat to adjacent portions of the tubing. The jaws of a sealer will tend to become hotter and hotter, not from the RF energy transmitted thereacross but as a result of heat transfer from the tubing to the jaws. By eliminating essentially all excess heating of the tubing, the heat available for transmission to the jaws is minimized and heat buildup of the jaws will not occur. That is, by minimizing the heating of the tubing after a seal has been completed, the period of time available for heat transfer is minimized.

The operation of the circuit to be described is, as stated, in a quiescent or standby mode for most of the time. During this standby mode, no heat of any significance is generated by the components of the circuit. During formation of a weld and the application of RF energy, heating of the circuit components will occur. However, the period of time of application of heat is extremely short (normally less than 1 second). Whatever heat buildup there may occur during application of RF energy, it is dissipated during the time period between welds through normal convection and conduction. Heat sinks, cooling air flow or other heat dissipating elements are not necessary. This lack of heat buildup permits great latitude in the configuration and size of hand held sealers and fixed base sealers. Moreover, relatively inexpensive plastics may be used for housing the components without fear of damage due to heat. The lack of any problem with heat buildup permits substantial freedom in packaging and selection of relatively low cost materials and configurations for such packaging.

Because of the self regulation of the sealer to be described, the preset parameters and the lack of any adjustments to be made by an operator, minimal operating instructions are necessary. Thus, operators with essentially very little training can make welds of superior quality. The elimination of any significant training time and the possibility of using relatively low skilled labor reduces the costs of welding plastic through use of the present invention.

In a production line environment, the self-regulating feature of the present invention permits unattended operation. Moreover, the parameters attendant generation and transmission of RF energy provide a high confidence level of adequacy of the seal or weld being made. This high confidence level reduces the failure rate and can eliminate a part of the presently required inspection procedure.

Figure 1B:
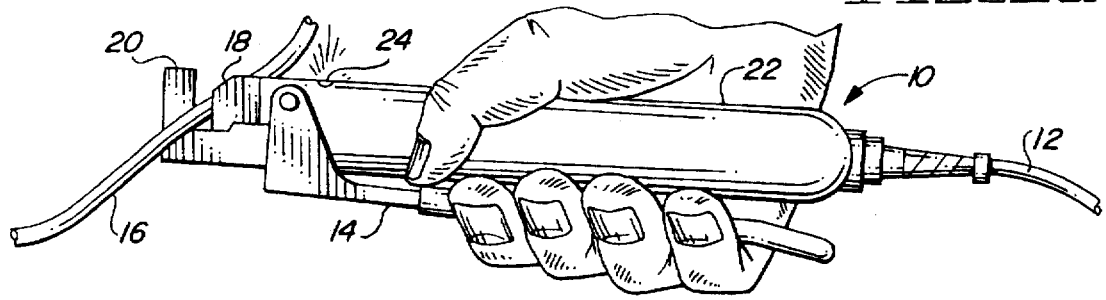

Referring to FIG. 1a, there is illustrated a representative hand sealer 10 connected through a coaxial cable 12 to an radio frequency (RF) generator (not shown). The hand sealer includes a manually operated trigger 14, as illustrated. To initiate a seal or weld across tubing 16, the tubing is placed intermediate fixed jaw 18 and moveable jaw 20. Upon actuating trigger 14, as illustrated in FIG. 1b, movable jaw 20 is drawn toward fixed jaw 18 to squeeze or compress tubing 16 therebetween. Simultaneous with movement of trigger 14, a mechanical switch internal to body 22 of hand sealer 10 is actuated to energize the RF generator. An indicator 24 may be actuated to advise the operator that a seal is presently being formed. Fixed and moveable jaws 18,20 compress tubing 16. Simultaneously, RF energy is transmitted across the jaws through tubing 16 resulting in heating and subsequent melting of the tubing to form, in combination with the compressive force of the jaws, a weld thereacross.

Figure 1C:
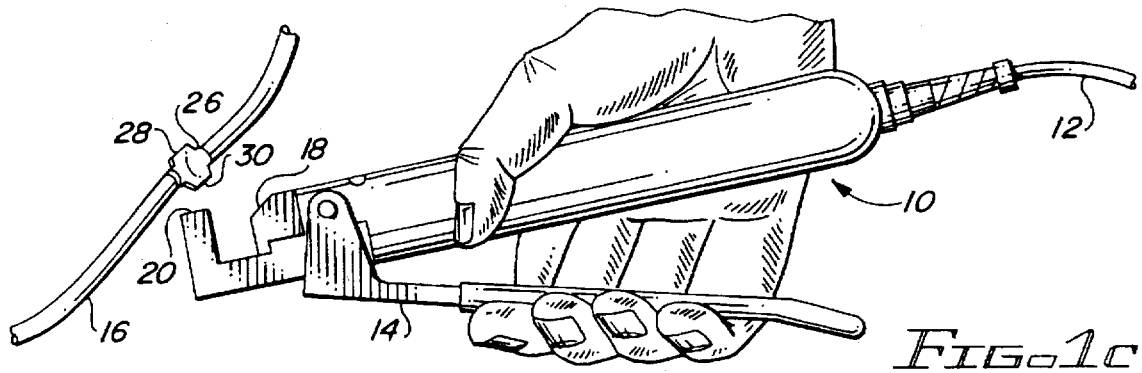

On extinction of visual indicator 24, as depicted in FIG. 1c, an operator is advised that the sealing process is terminated and trigger 14 is released. Release of the trigger separates movable jaw 20 from fixed jaw 18 and the tubing may be withdrawn. As clearly illustrated in FIG. 1c, a weld across tubing 16 has been formed. It has been determined that a "good" weld or seal 26 across the tubing will exist if the combination of melting of the tubing with the compressive force exerted by fixed and movable jaws 18,20 force lateral flow of the plastic to develop ears 28,30 disposed on opposed sides of the tubing. That is, such ears are indicative of an impermeable seal across the tubing.

Figure 2A:
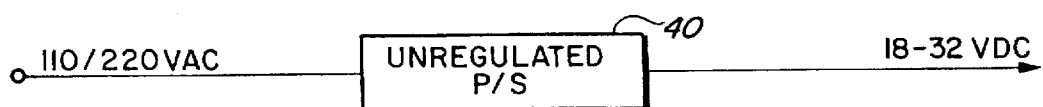
FIGS. 2a and 2b illustrate a block diagram of a prior art tubing sealer.
Figure 2B:
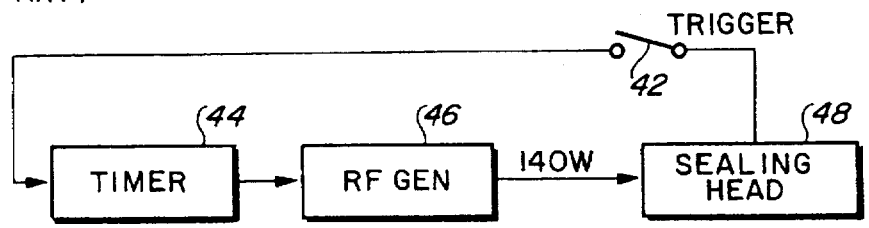

FIGS. 2a and 2b illustrate operation of the hand sealer described in U.S. Pat. No. 4,013,860. An unregulated power supply 40 converts a source of 110/220 volts alternating current to a direct current output in the range of 18 to 32 volts. Alternatively, the direct current power source may be provided by an equivalent portable battery back for field use. As particularly shown in FIG. 2b, a trigger in the hand held or in a fixed base tubing sealer initiates timer 44. The timer actuates RF generator 46 to provide approximately 140 watts power output at a frequency specified by the FCC to be 40.68 megahertz. The RF energy is transmitted across the jaws of sealing head 48 to heat and melt the tubing commensurate with the application of a compressive force exerted by the opposed jaws. The duration of the applied RF energy is controlled by timer 44 and is a function of the size and wall thickness of the tubing along with the thermal characteristics of the tubing. A further variable relates to the jaws and the spacing therebetween during compression. As a function of these and certain other variables, a power level for a specified duration was set for a particular size tubing used in conjunction with the configuration, mass and spacing of the jaws of the sealer. For different tubing wall thicknesses or size, different parameters would apply.

Figure 3A:
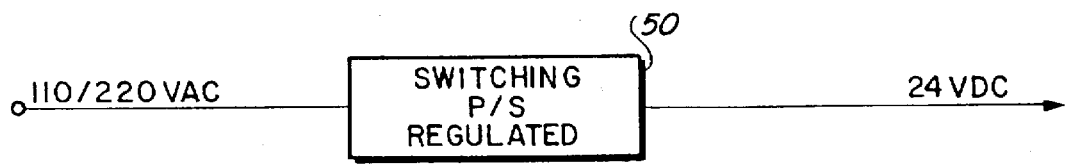
FIGS. 3a and 3b illustrate a block diagram of the present invention.

Referring to FIG. 3a, there shown a power supply 50 which provides a regulated 24 volt direct current output from a 110/220 volt alternating current source. This power supply may operate in accordance with conventional power supply techniques or it may be of a proprietary type developed by the assignee which is more efficient and develops less heat than conventional power supplies. The output of power supply 50 is provided to the circuit illustrated in FIG. 3b.

Figure 3B:
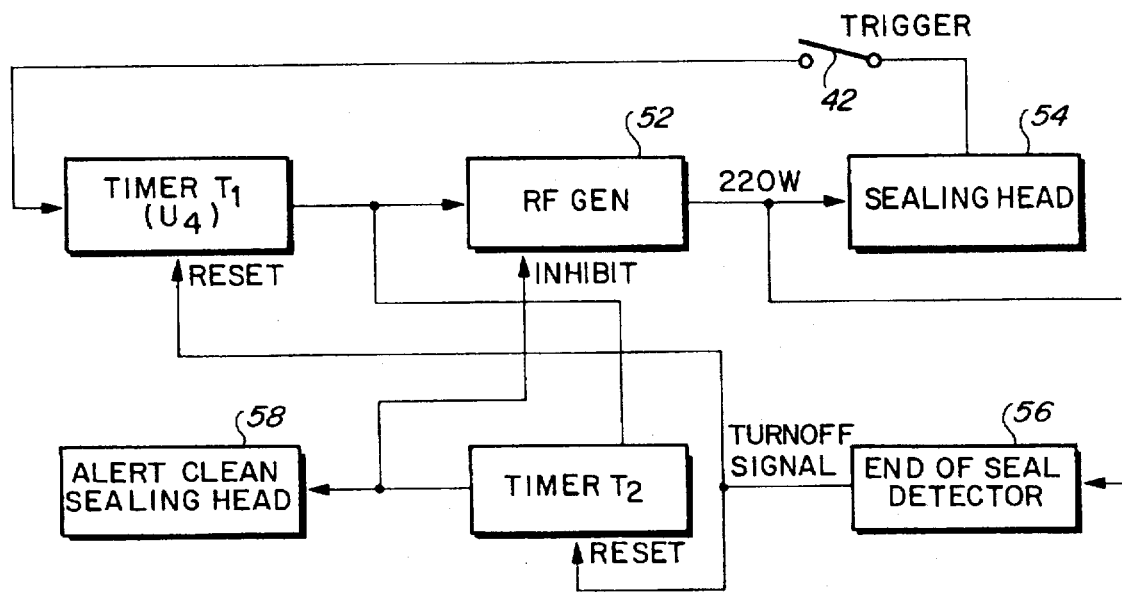

FIG. 3b illustrates in block form a circuit for controlling operation of an RF generator to heat and weld a length of plastic tubing compressed between the jaws of a hand held or fixed base tubing sealer, whether portable or not. On actuation of trigger 42 by manipulation of a sealer, such as hand sealer 10 shown in FIG. 1a, timer $T_1$ is activated. Timer $T_1$ has two functions. It has an internal preset turn off time period and a second function of turning off RF generator 52 prior to expiration of the preset time in response to an input signal. This signal is referred to as a reset signal. On activation of timer $T_1$, RF generator 52 is activated to provide an output of up to 220 watts. This power is applied across the jaws (see for example the jaws shown in FIGS. 1a to 1c) in sealing head 54 of the sealer. Coincident with turn on of RF generator 52, a second timer $T_2$ is activated.

During heating and compression of the tubing, the impedance between the pair of jaws will vary. This varying impedance will vary the power output of the RF generator and the power transmitted through the tubing. A circuit referred to as end of seal detector 56 detects the pattern or shape of the changing impedance. Upon detection of the end point of the impedance pattern, a turn off signal is generated. The turn off signal is applied to timer $T_1$ to reset it and to timer $T_2$ to reset it. Since the time period for making a seal is substantially shorter than the preset time period of timer $T_1$, this reset signal is applied to timer $T_1$ prior to expiration of the preset time period of timer $T_1$. In the event that the turn off signal were not generated by end of seal detector 56, timer $T_1$ would not be reset and RF generator 52 would remain energized until expiration of the preset time period of timer $T_1$. Generally, the preset time period of timer $T_1$ may be two seconds and to put such time period into perspective, the normal time period between actuation of RF generator 52 and generation of the end of seal signal may be one tenth of one second. Timer $T_1$, as well as initiating operation of the RF generator, initiates a preset time period for timer $T_2$, which time period may be one and one half seconds. In the event a reset signal is not received by timer $T_2$ prior to expiration of its preset time period, latching circuitry associated with timer $T_2$ will produce an inhibit signal to prevent further operation of RF generator 52. Simultaneously, an alarm signal is generated by an alarm unit 58, which may be a visible or audible signal/indicator.

After RF generator 52 has been inhibited from further power generation, resumption of operation of the sealer requires turn off of the unit as a whole to reset timers $T_1$ and $T_2$ and the latching circuit. Presumably, the mandatory turn off and turn on of the sealer suggests inspection, cleaning and maintenance, if necessary, of the jaws and sealing head before resumption of operation.

The tubing, compressed and partially melted between the jaws, changes the impedance between the jaws. This variation in impedance is sensed and is used to control the seal time. The change in impedance is also sensed by the end of seal detector 56 to determine when the seal has been completed. On completion, the detector 56 provides an output signal (reset) which causes RF generator to turn off.

To develop the impedance pattern, which goes from inductive to purely resistive to capacitive, tubing of interest is measured for its impedance value, as noted in the table below for a particular type and size of tubing.

TABLE 1

| 64 ∠ 75 | 16.56 + j61.82 | 0.33 + j1.24 |
| 80 ∠ 69 | 26.67 + j74.69 | 0.57 + j1.49 |
| 100 ∠ 61 | 48.48 + j87.46 | 0.97 + j4.75 |
| 150 ∠ 38 | 118.20 + j92.35 | 2.36 + j1.85 |
| 170 ∠ 0 | 170. + j0.0 | 3.40 + j0.0 |
| 150 ∠ −28 | 132.44 − j70.42 | 2.65 − j1.41 |
| 125 ∠ −36 | 101.13 − j73.47 | 2.02 − j1.47 |
| 100 ∠ −48 | 66.91 − j74.31 | 1.34 − j1.49 |
| 75 ∠ −59 | 38.63 − j64.29 | 0.77 − j1.29 |
| 60 ∠ −62 | 28.17 − j52.98 | 0.56 − j1.06 |
| 50 ∠ −65 | 21.13 − j45.32 | 0.42 − j0.91 |

TABLE 1-continued

| | | |
|---|---|---|
| 40 ∠ −58 | 21.20 − j33.92 | 0.42 − j0.68 |
| 30 ∠ −70 | 10.20 − j28.19 | 0.21 − j0.56 |

Figure 4:
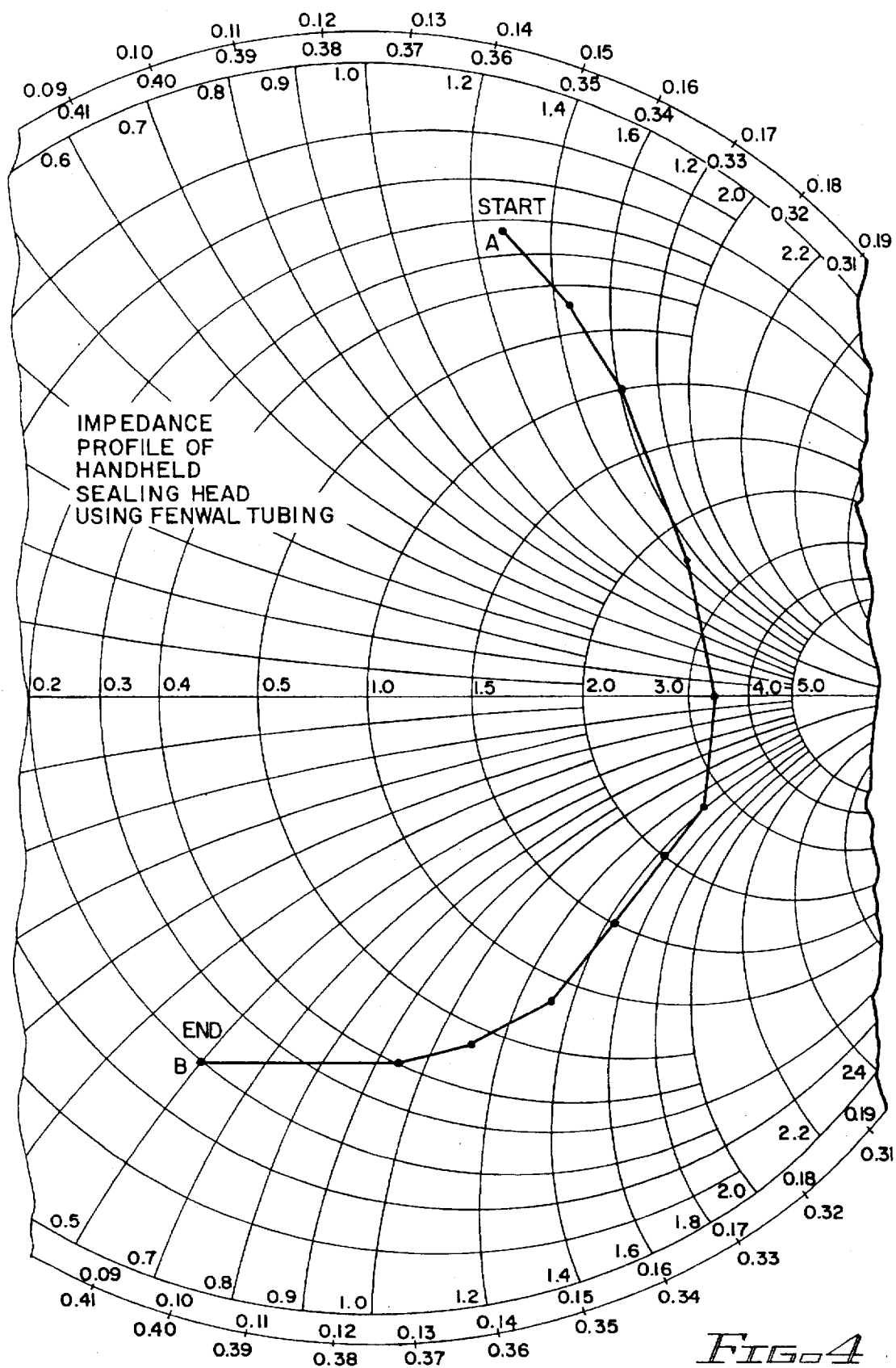
FIG. 4 illustrates the variable impedance superimposed upon a Smith chart.

The impedance measurements appearing on the left column indicate a complex number. In line 1 it is 64 at an angle of 75° which corresponds with a complex impedance of 16.56+j61.82. For analytical reasons and as the system is operating at an input and output impedance of 50 ohms these numbers have been normalized to a standard 50 ohm Smith impedance chart, as illustrated in FIG. 4. The corresponding normalized number would be 0.33 ohms with an inductive reactance of 1.24 ohms. This value is charted on the Smith chart as point A and represents the start point of the impedance curve or pattern. The last line of the Table 1 represents the finish or end of the pattern point normalized to 0.21 ohms with a capacitive reactance of 0.56 and plotted as data point B.

To develop an appropriate impedance matching network, it was necessary to measure the pattern of the varying impedance during operation of the sealing head jaws with tubing under different degrees of compression. During heating and compression of the plastic, the impedance changes continuously until the plastic reaches its final shape. Data of the impedance changes throughout execution of the seal was empirically determined, as noted in Table 2.

TABLE 2

| Condition | Impedance | Capacitance |
|---|---|---|
| Jaw open | 64 ∠ 90 | 6.11 pF |
| Tube loose | 570 ∠ 90 | 6.88 pF |
| Tube tight | 540 ∠ 90 | 7.25 pF |
| Tube compressed | 430 ∠ 90 | 9.1 pF |

Figure 5:
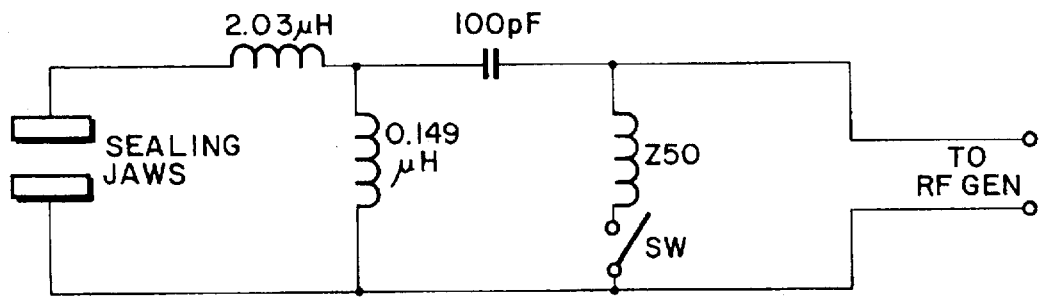
FIG. 5 illustrates a double tuned circuit for the sealing jaws.
Figures 6A, 6B:
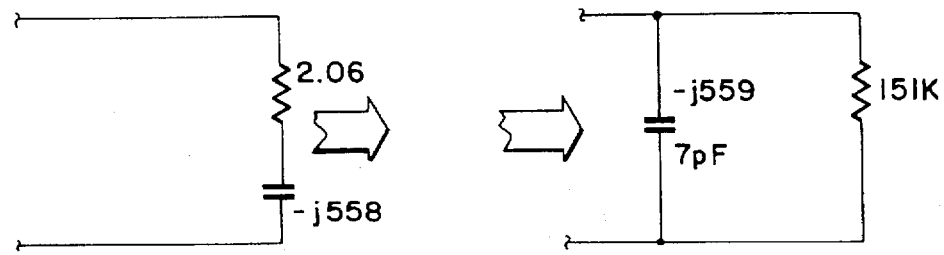
FIGS. 6a and 6b illustrate the equivalent circuit for the jaw impedance at resonance of the circuit shown in FIG. 5.

With this data, a simple network was developed to bring about impedance matching during execution of the seal. That is, a network had to be developed that translated the time varying impedance to a specific region of the Smith chart. The impedance must begin inductive and end capacitive to obtain the pattern illustrated. For this purpose, the double tuned circuit illustrated in FIG. 5 was developed. The impedance data of Table 2 was obtained by taking measurements at the sealing jaws. The impedance meter employed lacked sufficient sensitivity to measure the real part (resistance element) of the jaw impedance. The real part was therefore indirectly measured. By measuring the impedance of the complete jaw assembly at resonance, the impedance of Z=(170+j 0.0) was found. With the element values shown in the circuit of FIG. 5, it can be determined that the jaw impedance at circuit resonance is (2.06−j 558). The equivalent circuit is shown in FIGS. 6a and 6b. The load impedance of the circuit shown in FIG. 6b can be mapped as shown in the accompanying Smith chart, FIG. 4.

It may be noted that the curve depicted in the Smith chart, FIG. 4, is capable of being detected by detector 56. Depending upon the degree of deviation permitted as a function of variations in the tubing to be sealed, including different diameter and different wall thickness tubing, the parameters of detector 56 would be commensurately altered to accommodate generation of an end of seal detection signal rather than a fault condition. The extent and boundary of the "window" for an acceptable pattern is variable, depending upon parameters of the sealing equipment and its intended use. To emphasize the degree of sensitivity possible with detector 56, it has been learned that impedance changes due to a thirty degree temperature excursion of the tubing would provide a sufficient deviation from a predetermined pattern to result in detection of a fault; similarly, even talcum powder deposited on the tubing can change the impedance sufficiently to cause a fault condition.

In summary, when tubing is placed between the jaws, the impedance presented to the RF generator is dynamic. It is ever changing as the jaws heat and compress the tubing to its final form. With a proper impedance matching network, the impedance presented can form an arc similar to that shown in the Smith chart. At the beginning of the seal (start data point A), the impedance is inductive (16.56+j 61.82), and at the end of the seal (end data point B), the impedance is capacitive (10.20−j 28.19). At the mid point of the seal, this is resonance with an impedance of Z=170+j 0.0. Maximum energy is delivered to the tubing at this point. During execution of the seal, the impedance excursion causes a varying loading to the RF generator. Because of the varying load impedance, the output voltage of the RF generator, which has a source impedance of 50 ohms, will vary.

Figure 7A:
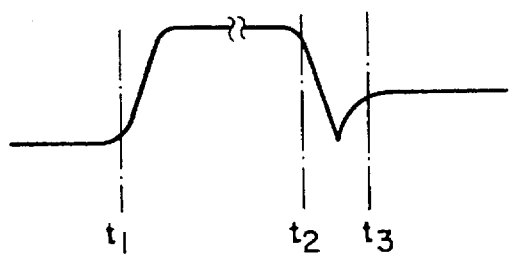
FIGS. 7a and 7b illustrate the wave form of the output of the RF generator and a modified wave form to facilitate detection of the end of seal.

Referring to FIG. 7a, there is shown a representative output voltage of the RF generator during time periods $t_1$, $t_2$ and $t_3$. The time period $t_1$ depicts the voltage at the initial turn on of the RF generator. The time period $t_2$ corresponds with melting of the tubings and subsequent rapid closure of the jaws. The time period $t_3$ is representative of the end of the seal. If the RF generator is turned off at time $t_2$, the quality of seal 26 is below acceptable standards. That is, it will not necessarily include laterally extending ears 28,30 (see FIG. 1c). To ensure formation of the ears, an additional time period for energization of the RF generator is provided, as represented by the time period between $t_2$ and $t_3$.

Referring to FIG. 9, there is shown a schematic diagram of the end of seal detector 56, which circuit includes delay elements primarily responsible for the extended time period between $t_2$ and $t_3$. This circuit, in summary, provides a comparison between the voltage input to comparator U2/D as a function of the difference in discharge times between capacitor C32 and capacitor C31. Thus, the values of these two capacitors regulate the time period $t_2$ to $t_3$ and the corresponding voltage decay. More particularly, the output voltage of the RF generator is sampled and resistor R52, blocking capacitor C48 and shunt resistor R51 form a voltage divider. Thereby, a radio frequency (40.68 megahertz) signal at a level of approximately 8 volts is presented at the anode of diode D6 where it is rectified and passed in two directions: to the anode of diode D5 to charge capacitor C32 and to the base of transistor Q12 and emitter followed to charge capacitor C31. It may be noted that capacitor C31 is ten times larger than capacitor C32. The voltages, V2,V3, across capacitors C32 and C31, respectively, are approximately equal during charging. As the jaws begin to close due to melting of the tubing, as reflected by the decaying voltage between time periods $t_2$ and $t_3$, the voltage across resistors R52 and R51 begins to decay. As the voltage across resistors R52 and R51 begins to decay, capacitor C32 is discharged through shunt resistor R30. Capacitor C31 is discharged through zener diode CR6 and shunt resistor R31. Of the two resulting decaying signals, one will out run the other. The decay on capacitor C32 is more rapid than that of capacitor C31. Because of the difference in discharge rate of capacitor C32 and C31, voltage V3 at comparator U2/D will become greater than voltage V2 and an output from the comparator will occur. The timing of this output is equivalent to time period $t_3$ shown in FIG. 7a. Since Zener diode CR6 (FIG. 9) controls the degree of offset, the final firing point can be controlled by appropriate selection of values of the Zener diode. The output of comparator U2D generates the reset signal for timers $T_1$ and $T_2$, as discussed above. The selection of values for capacitor C32 also affects the firing point or time period $t_3$.

FIG. 10 illustrates timer U4 ($T_1$) that has a preset time period determined time by capacitor C35 and resistor R35 at pin 2 and capacitor C35 and resistor R35 at pin 7. Timer U4 may be either an AM555 or an LM 556, depending on choice of the circuit designer. Reset of the timer is provided at pin 4 from comparator U2/D (see FIG. 9) which provides a negative going pulse at pin 4. Upon input of a reset pulse, the timer time period terminates immediately. The output of the timer is passed to transistor Q13 at pin 3 through resistor R33. An output signal at the base of transistor Q13 turns on the transistor and the collector is pulled to ground. Thereupon, a signal is provided to key the RF generator to the "on" mode through other circuitry not illustrated in FIG. 10 (see FIG. 11).

Figure 11A:
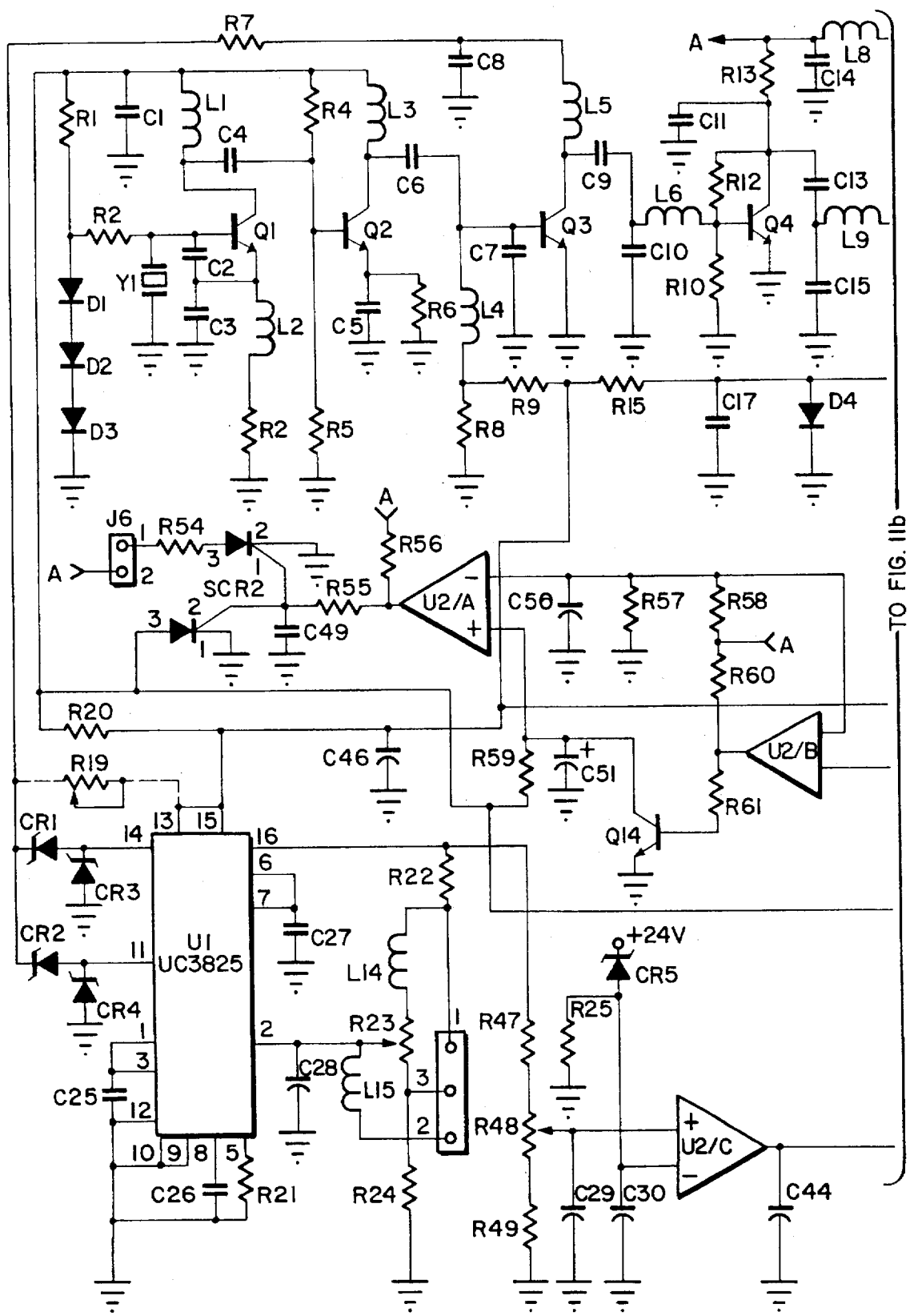
FIGS. 11a–11b are schematics of the RF generator and its associated circuitry.
Figure 11B:
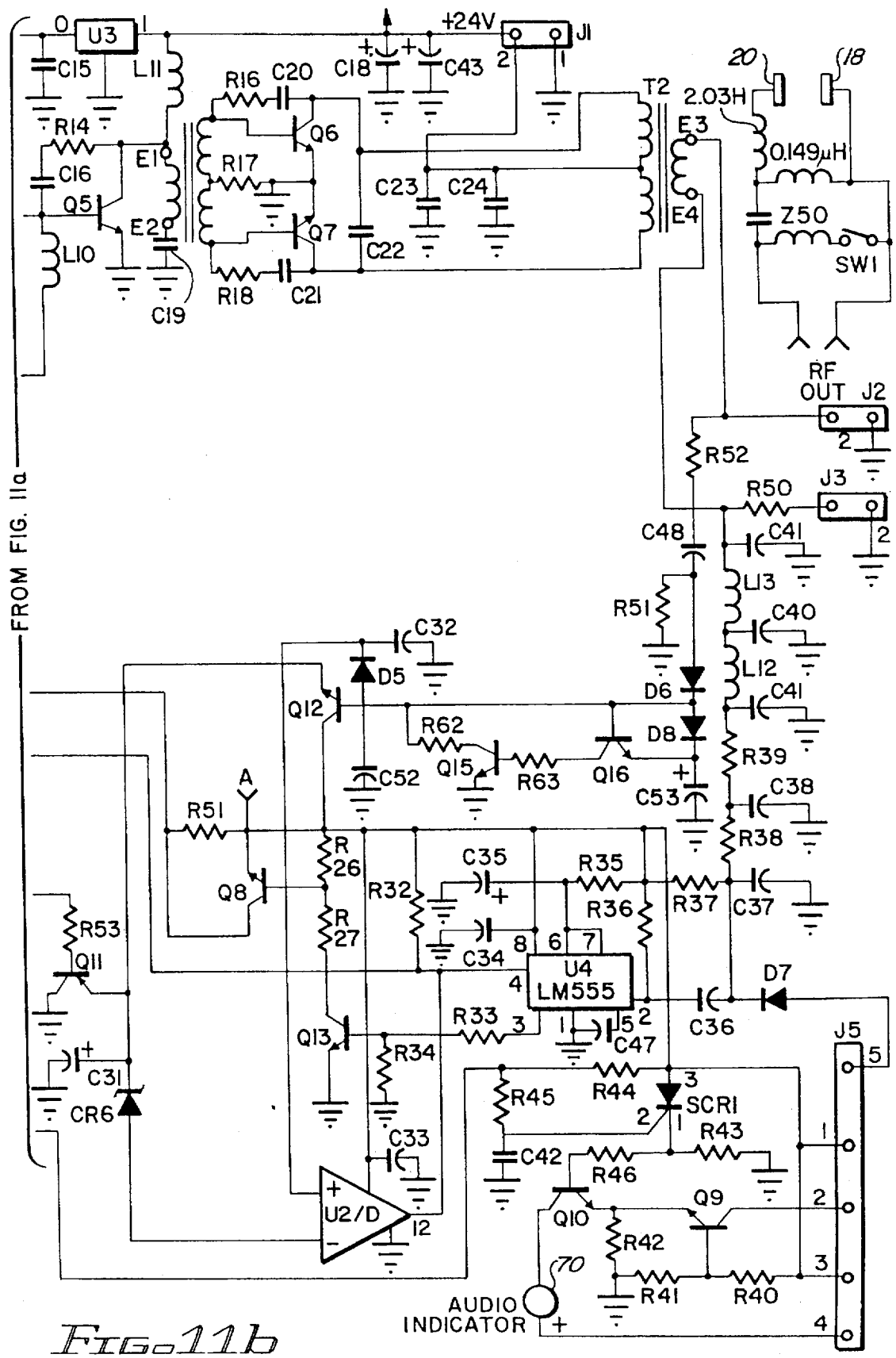

Referring to FIG. 11 there is shown a schematic of the circuit represented in block form in FIG. 3b and including the circuits shown in FIGS. 5, 8, 9 and 10. Associated with the trigger for the sealer is a switch SW1, which switch is actuated upon movement of the trigger to begin to compress the tubing between the jaws. The circuit is connected to connector J2 having terminal 1 connected to the RF output and terminal 2 is grounded. When switch SW1 is closed, terminal 1 is grounded through an inductor and a negative going pulse is produced at terminal 1. Terminal E4 of transformer T2 has a low pass filter network formed of capacitors C41, C40, C39, C38 and C37 along with inductors L13, L12, and resistors R39 and R38. This low pass filter will not allow the 40 megahertz output signal of transformer T2 to reach the other circuitry.

At pin 2 of timer U4 ($T_1$) there will be a negatively going pulse from terminal 1 of connector J2 for a few microseconds upon closure of switch SW1. This pulse will key the timer to initiate a preset timing period. During this timing period, the output at pin 3 is high. The output from pin 3 through resistor R33 to the base of transistor Q13 causes current to flow through the emitter base junction of transistor Q13. When transistor Q13 turns on, current will flow through the emitter base junction of transistor Q8 through resistor R27. When transistor Q8 is turned on, 12 volts, from source A, is available at the collector minus a voltage drop of approximately 0.6 volts. The resulting 11.4 voltage at the collector of transistor Q8 is available for various other circuits. Specifically, voltage is supplied to pins 13 and 15 of pulse width modulator U1 operating at approximately 40 kilohertz or any other frequency to be determined. The output of the pulse width modulator is available at pins 11 and 14. These positive going pulses are gated together through Schottky barrier diodes CR1 and CR2 and applied to the collector of transistor Q3 through a filter network of resistor R7, capacitor C8 and inductor L5. The purpose of the filter network is to allow pulses to be applied to the collector and to block or isolate the radio frequency energy (40.68 megahertz) and to permit the radio frequency energy to pass only in one direction through capacitor C9 and inductor L6 to the base of transistor Q4. In addition, the collector of transistor Q8 applies dc bias to the collector of transistor Q1.

Transistor Q1 in combination with crystal Y3 is an oscillator operating at an FCC specified voltage of 40.68 megahertz and provides a signal to the base of transistor Q2, which transistor serves as a buffer amplifier. Transistor Q8 provides a dc bias to the collector of transistor Q1 simultaneous with the bias provided to the collector of transistor Q2. Thus, radio frequency energy at a low power level is available from transistor Q2 (a buffer amplifier) and transmitted to the base of transistor Q3. Transistor Q3 cannot provide an output until its collector voltage is applied. The voltage applied to the collector of transistor Q3 is in the form of pulses of varying width supplied by pulse with modulator U1 at a 40 kilohertz rate. Thus, the wider the pulses the greater average power; as the pulse width is narrowed, a very low level or almost no power output from transistor Q3 is possible. Each time a pulse is present on the collector of transistor Q3, the peak power from transistor Q3 is a constant and a maximum. The average power is controllable by the width of the pulses present on the collector of transistor Q3 and may be referred to as the duty cycle of transistor Q3. Accordingly, the peak to peak voltages are constant and independent of the output power level. This feature is critical to the end of seal detection circuitry. That is, the end of seal detection circuit works independently of the adjusted power level and it can operate satisfactorily at any power level, whether 30 watts or 220 watts. This results because the peak to peak voltages sampled anywhere in the system is the same. Peak voltage detecting circuitry used is not influenced by the average power level generated.

Transistor Q4 is a conventional class C amplifier; the output from its collector is conducted to transistor Q5 which is another buffer amplifier. This stage has a slight forward bias to effect a gain. The final or output stage is conducted through a transformer T1 to the base of a push-pull amplifier formed by transistors Q6 and Q7. The output of the push-pull amplifier is outputed to transformer T2. Amplifier Q4 and the two output stages, transistor Q5 and push-pull transistors Q6 and Q7 all have fixed bias (collector voltages applied at all times). No switching or changing of the voltage levels of the output pulses is performed. This avoids the high current switching normally associated with output stages. Moreover, the efficiency of pulse width modulation may be degraded. These problems are effectively sidestepped by modulating a low power stage, transistor Q3. The output of transformer T2 at terminal E3 is connected through terminal 1 of connector 2 via a coaxial cable of a length of λ/2 across jaws 18 and 20 with jaw 18 being grounded. Terminal E4 of transformer T2 is grounded through bypass capacitor C41.

When switch SW1 is open, there is established a DC voltage level on the secondary of transformer T2 by voltage source A (12 volts) through resistor R37. As mentioned previously, when switch SW1 is closed, this voltage level switches to nearly ground potential. A voltage divider formed by resistor R51 and R52 is connected to terminal E3 of transformer T2 to sample the voltage applied across jaws 18,20. Capacitor C48 is a DC blocking capacitor to ensure maintenance of a DC bias on the secondary of transformer T2 during an open condition of switch SW1.

As shown in both FIGS. 9 and 11, diode D6 rectifies the RF voltage level and applies it to diode D5 and also to the base of transistor Q12. The rectified voltage level through diode D5 charges capacitor C32. Capacitor C31 is charged through emitter follower transistor Q12, which capacitor is charged at the same rate as capacitor C32, as discussed previously with respect to the end of seal detector illustrated in particular in FIG. 9. Resistors R28 and R21 in combination with resistors R30 and R31 are two independent voltage dividers that would ensure that at the system initial turn on proper bias is provided to comparator U2/D. In particular, at the initial turn on the output of comparator U2/D has to be high to provide an input to pin 4 of timer U4 (T₁). Otherwise, the timer could not be keyed.

Figure 7B:
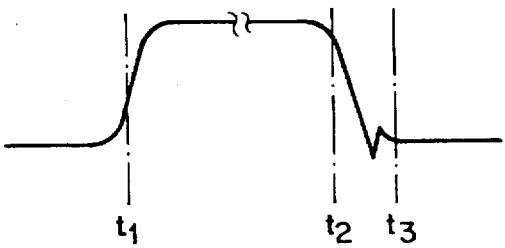
Figure 8:
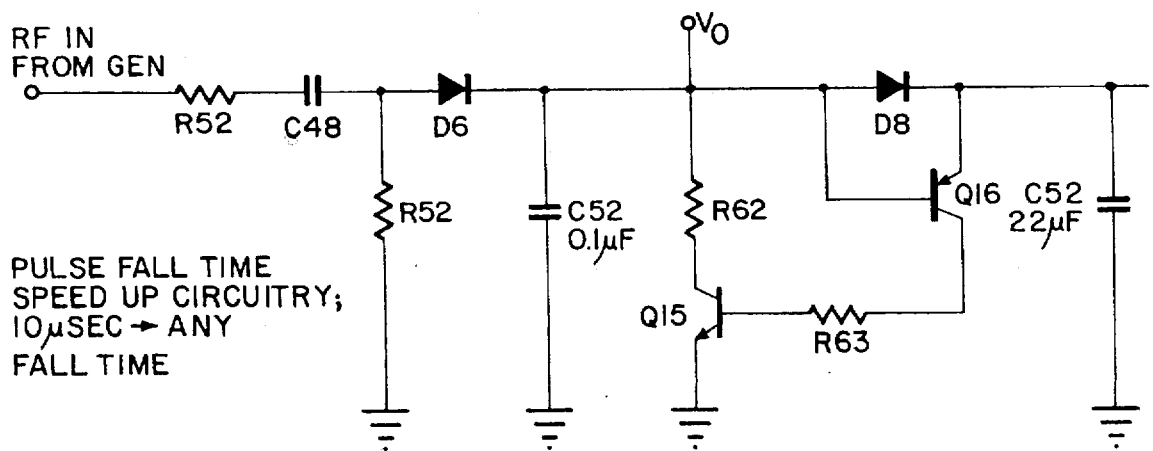
FIG. 8 illustrates a circuit for modifying the voltage wave form depicted in FIGS. 7a and 8b.

The output at the cathode of diode D6 has a "sloppy" fall time. The wave form at time t₂ (see FIG. 7a) should not impede the natural decay of timer capacitor C31. It would therefore be preferable, as the pulse begins to decay, to speed up the decay to enhance the sensitivity of the system, as depicted in FIG. 7b. This is achieved by producing the equivalent of a silicon controlled rectifier (SCR) but one with control of the gain, as shown in FIGS. 8 and 11. If a perfect SCR were used, any slight decay would cause an immediate latch up. The signal rectified by diode D6 is applied to the base of transistor Q16 to permit relatively rapid charging of capacitor C53. At the end of the seal when the RF starts to decay there is nothing to discharge. Capacitor C53 will try to remember that 8 volts peak was reached during the middle of the seal. When the signal starts to decay and passes the voltage at time period t₂ the emitter base junction of transistor Q16 is forward biased. The voltage at the emitter is held constant and the voltage at the base is falling and the transistor turns on. When it turns on through resistor R63, which is connected between the collector of transistor Q16 and the base of transister Q15, transistor Q15 turns on. When transistor Q15 turns on, because of current on the base, the collector draws much more current based upon the beta of the transistor and the resistive value of resistor R62 and resistor R63, the charge on the cathode of diode D6 collapses even faster. As the voltage collapses faster, a positive regeneration occurs which is exactly the equivalent of an SCR. To have the circuit be a perfect SCR, that is a PNPN junction, the values of resistors R62 and R63 need only be made zero. In essence, transistors Q15 and Q16 comprise a pulse fall time speed up circuit. It can convert a pulse that would have a normal fall time of ten microseconds to a fall time of practically any duration, including approximately one microsecond. Thus, once the decay has started, the end of seal detection circuit depends only upon the values of capacitors C31 and C32.

The end of the seal time period t₂ is reached where the jaws have almost completed their excursion to compress the tubing therebetween but prior to formation of the ears attendant the seal (see FIG. 1c). Due to the speed up circuit represented by transistors Q15 and Q16, the voltage at the anode of diode D5 approaches zero. Thereafter, capacitors C31 and C32 discharge through two different time constants (see FIGS. 9 and 11). The capacitor C32 discharge is through resistor R30 to ground. This resistor in combination with the value of capacitor C32 provides a relatively rapid decay time compared to the decay time of the capacitor C31 through resistor R31 and their values. The ratio is approximately 10:1. The difference in the decay time in combination with the offset provided by Zener diode CR6, will cause comparator U2/D to go low. This signal, appearing on pin 4 of timer U4 (T₁) will reset the timer. When the timer resets, the output level on pin 3 of timer U4 goes low and transistor Q13 turns off causing transistor Q8 to turn off. The voltage to pin 15 of the pulse width modulator is removed. Voltage to the crystal oscillator, transistor Q1, and transistors Q2 and Q3, is removed and the RF output ceases immediately.

In the event of a fault, the output voltage of diode D6 will not have a fall time. That is, there will be no voltage excursion. Accordingly, with the constant voltage level, transistors Q15 and Q16 will not fire. The output level to comparator U2/D through diode D5 will be at such a level that the output of this comparator stays high. When the signal on pin 4 of timer U4 (T₁) stays high, the timer will not be reset and the RF generator will continue to function to provide an RF output. Timer T₂ (see FIG. 11), is formed by comparator U2/A. The negative input of this comparator is a six volt level provided by resistors R57, R58 in combination with a 12 volt supply at terminal A. Resistor R59 and capacitor C51 form an RC integrator. When transistor Q8 turns on, its collector reaches a voltage of 11.4 volts. A positive voltage through resistor R20 is applied to resistor R59 and capacitor C51 becomes gradually charged. As the voltage rises to a value above the 6 volt reference voltage, comparator U2/A is turned on causing its output to go high. When its output goes high, SCR2 and SCR3 are turned on. The anode of SCR2 is connected to junction J6 through resistor R54. The other terminal of junction J6 is connected to a 12 volt source A. An alarm, whether visual, audible or remote, is connected to junction J6 and actuated when SCR2 is turned on. When SCR3 turns on, it shorts resistor R20 to ground. The voltage level that used to be 11.4 volts drops to approximately 0.6 volts. This low voltage, applied to the oscillator, transistor Q1, will cause the oscillator to cease oscillating. The remaining stages perform no further amplification and the RF output ceases. If an attempt is made to perform a further seal on the tubing by operating the trigger and switch SW1, actuation of the oscillator, transistor Q1 cannot be achieved since SCR3 is latched and only 0.6 volts is available at the collector of transistor Q1. The only way SCR3 can be unlatched is that of turning off the system to remove the latching bias on SCR3 and reactivating the system. The purpose of resistor R51 across the emitter and collector of transistor Q8 is to provide a bias on the anode of SCR3.

For portable hand sealers, a battery power source is used, which source is composed of rechargeable batteries. To ensure adequate power for the RF generator, it is necessary to provide a warning of a drop in battery voltage due to depletion. Such a warning is provided by an audio indicator 70. That is, upon actuation of the indicator, the operator is advised to recharge or replace the battery source. The operation of indicator 70 is described hereafter with reference to FIG. 11. A precision voltage level is provided at pin 16 of pulse width modulator U1, which may be a 5 volt reference level. This voltage is regulated by the modulator (U1) circuitry and independent of the actual battery voltage. The circuit about to be described is useful only for a portable sealer wherein a battery source is required. For a fixed base sealer, the circuit to be described may even be omitted.

A voltage picked off resistor R48 is applied to the positive input comparator U2/C. The battery source voltage, represented by the symbol +24V is applied to the negative input to the comparator through a Zener diode CR5 and return current path provided by resistor R25. Instead of using a normal voltage divider, a Zener diode is used for high sensitivity of the voltage. For example, if a voltage of 2.5 volts would be applied to the positive input to the comparator, the voltage applied to the negative input would be somewhat higher than 2.5 volts. Under these conditions, the output level of the comparator is low and no signal is applied to SCR1. As the capacity of the battery becomes depleted, the voltage at the negative input to the comparator will begin to drop. Depending upon the battery voltage under load condition, the voltage present at the positive input to the comparator can be adjusted through resistor R48 to adjust the trip point of the comparator commensurate with a minimum acceptable voltage at the battery power source, such as 17 volts. Thus, comparator U2/C can be made to go high when the battery reaches a trip voltage level of 17 volts. When SCR1 fires in response to the comparator output, a positive voltage is presented to the base of transistor Q10.

The collector of this transistor allows current to flow through the audio indicator, which also requires a positive voltage on pin 4 of junction J5. Transistor Q9 has a voltage applied to its base created by voltage divider R40 and R41, of approximately 6 volts. When SCR1 is not activated, transistor Q9 is activated due to a preestablished bias at its base. With the addition of an appropriately connect LED, transistor Q9 is capable of providing a signal indicative of a battery good or battery ready condition. For example, the battery good condition LED would have its cathode connected to pin 2 of junction J5 and its anode connected to a battery voltage source. In the event transistor Q10 is activated because of a battery low condition, the emitter voltage of transistor Q10 is elevated to a point that causes the emitter voltage of transistor Q9 to exceed the reference voltage present at its base and its collector current is turned off. When this happens, the battery good condition is removed and an appropriate indicator (LED) would so indicate.

With appropriate connection to junction J5, sealing can be inhibited when an external charger is attached to the battery for purposes of product safety. Moreover, it will avoid having alternatively current available simultaneously with operation of the RF generator. To achieve this end, a positive voltage from the charger is applied to pin 5 of junction J5. This positive voltage is conducted through diode D7 to the junction of resistor R37, resistor R38 and capacitor C37. If this potential is held high due to the bias of diode D7 then the trigger voltage created by closing of switch SW1 is defeated and the unit cannot be keyed.

Three terminal voltage regulator U3 provides, at each point "A" a regulated 12 volt power source from a 24 volt power source represented at pins 1 and 2 of junction J1. It is to be understood that a 12 volt, rather than a 24 volt battery source may be used. In such event, voltage regulator U3 can be omitted or shorted by a jumper across terminals I and O. Appropriate modifications of the voltage levels to comparator U2/C would have to be made to reflect the trip voltage for a 12 volt power source.

The circuitry described above has the capability to interrupt a sealing operation independent of the operator. Once latch up occurs, the system must be turned off through the on/off switch. During such switching, the jaws and the cleaning head may as well be cleaned since no further operation can be performed until the problem causing the latch up is eliminated. There is no feature available for defeating the latching operation. Under certain conditions, the circuit may be too sensitive and result in latch up under conditions not warranting, as a practical matter, cessation of the weld making or tube sealing process.

Figure 12A:
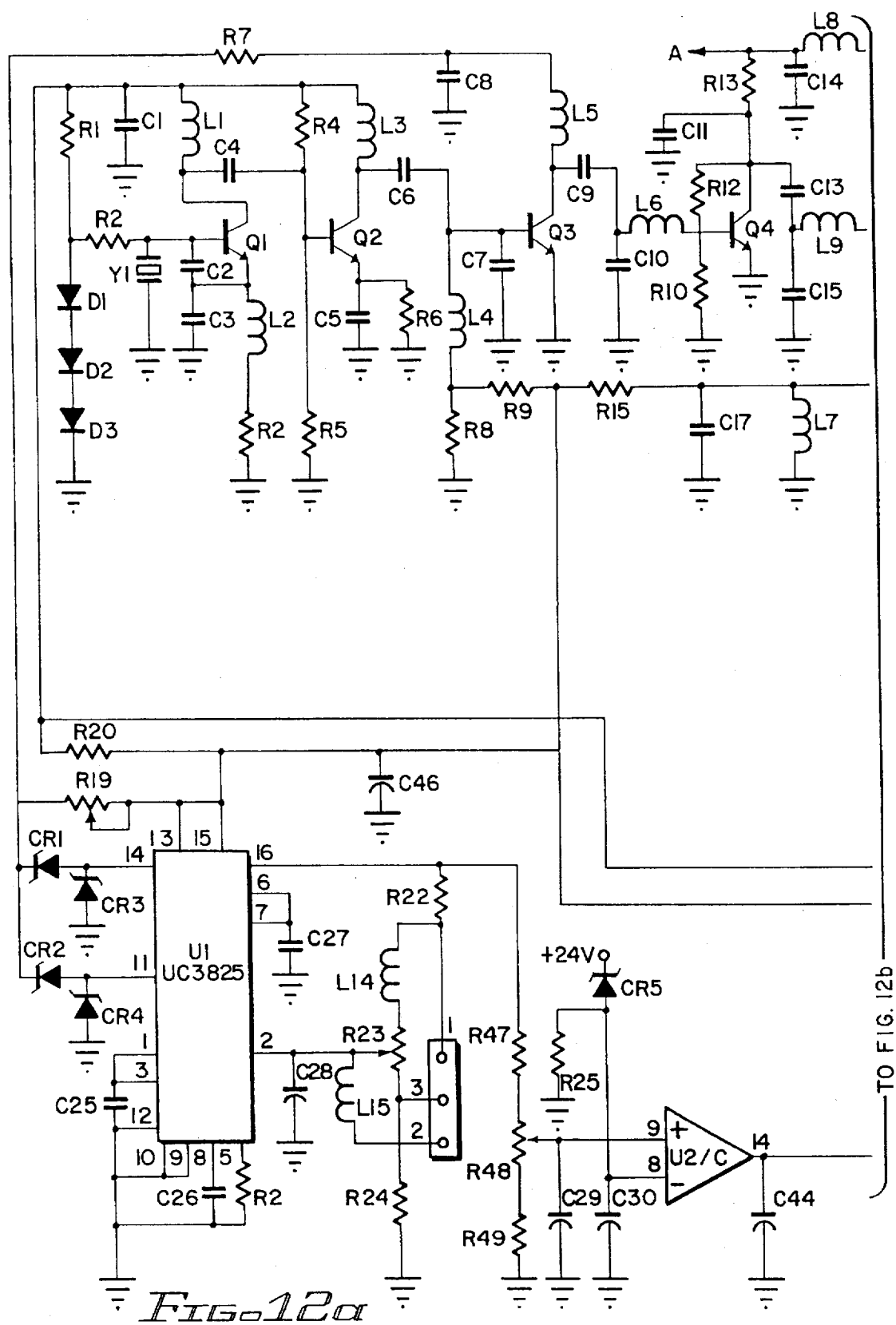
FIGS. 12a–12b are schematics illustrating the circuit shown in FIG. 11 absent the latching circuit but including an arc detection circuit.
Figure 12B:
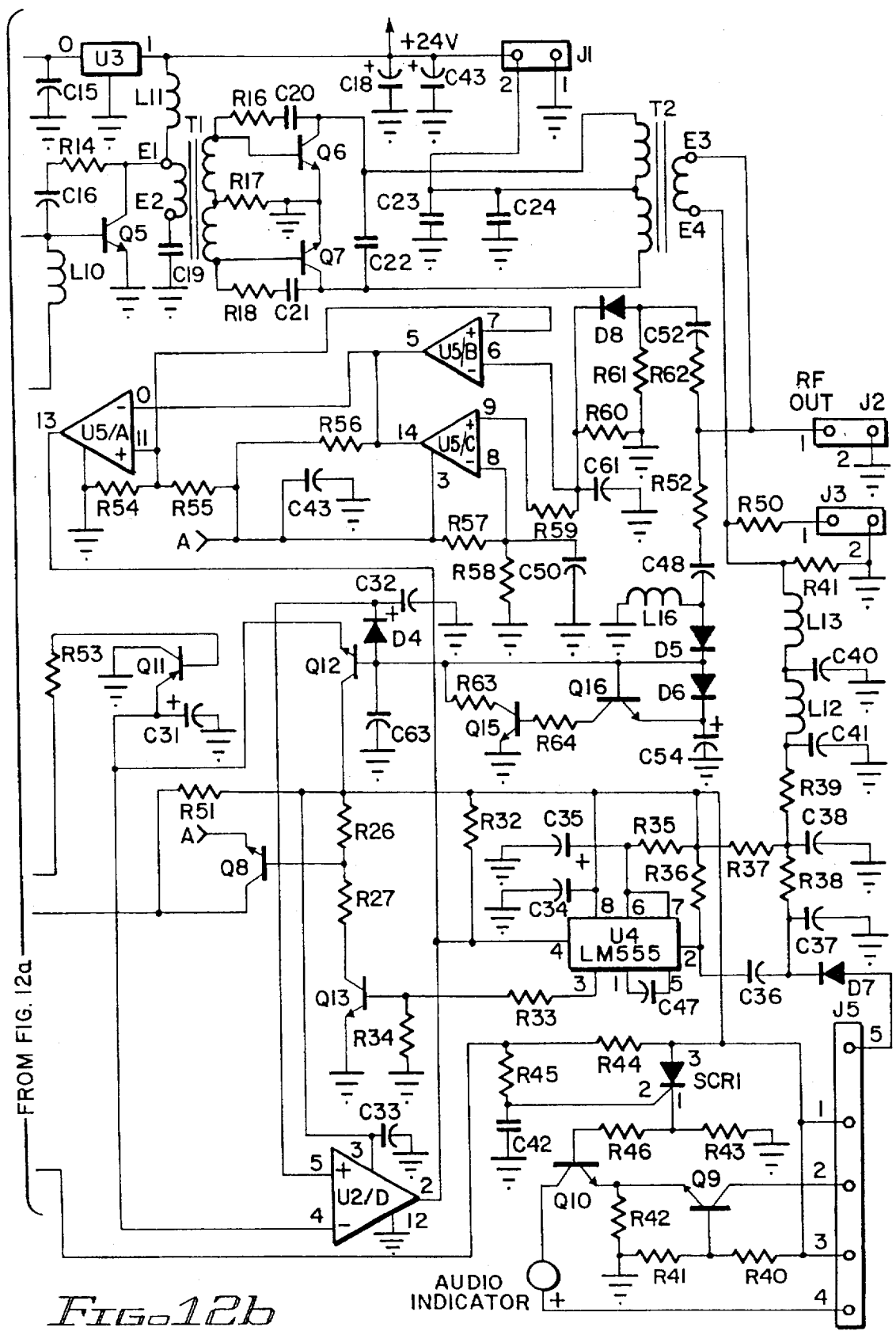

To desensitize the circuit shown in FIG. 11, and eliminate certain conditions for latch up, a modified circuit, as shown in FIG. 12, was developed. This circuit includes essentially the same nomenclature and terminology for elements common with the circuit shown in FIG. 11. As will be noted, SCR2 and SCR3 and attendant circuitry has been eliminated. Under certain conditions, arcing between jaws 18,20 can occur. Such arcing may pit or otherwise physically damage the jaws. To ameliorate, if not inhibit, the damage from arcing a circuit section shown in FIG. 12 was developed. This circuit can also be embodied in the circuit shown in FIG. 11.

During arcing between the jaws there is a small voltage level change available at terminal 1 of junction J2 which is a dynamic change similar to that detected by the end of seal circuitry. For a rapid minute fall time corresponding with arcing, an output signal is available at pin 13 of comparator U5/A which resets timer U4 ($T_1$) through pin 4. Thus, the RF energy is instantly removed to prevent further arcing. The system can be turned off to prevent arcing with a time constant of approximately 10 milliseconds and save the jaws by protecting them against pitting and physical damage. The sole function of comparator U5 is that of detecting and terminating an arcing condition across jaws 18, 20. Without the latching network, reinitiation of RF energy is brought about by simply actuating switch SW1 through opening and closing of the jaws by manipulation of the trigger.

A more specific discussion of the circuit components shown in FIG. 12 follows. Resistor R62, connected to pin 1 of junction J2 and terminal E3 of the transformer, in combination with resistor 61, form a voltage divider network. The output from the voltage divider is rectified by diode D8.

The output of diode D8 is tied to pin 6 of comparator U5/B and through resistor R59 to pin 9 of comparator U5/C. Under normal conditions, the voltage applied to pin 6 of comparator U5/B is higher than the voltage applied to pin 7 from 12 volt power source A through resistors R55 and R54 and the output of comparator U5/B is low. With a low input to terminal 10 of comparator U5/A, the output on pin 13 will remain high and timer U4 ($T_1$) will remain unaffected. If an arc occurs, the voltage level at pin 6 of comparator U5/B will go low and if it is sufficiently low beyond the reference voltage present at pin 7, the output of the comparator U5/B will go high and the output at pin 13 of comparator U5/A will go low and cause a reset of timer U4 ($T_1$). The signal applied to pin 9 of comparator U5/C has a time delay due to resistor R59 and capacitor C50. If the input to pin 9 of comparator U5/C remains high sufficiently long, depending on the time constant, output 14 will go high. The high input of to pin 10 of comparator U5/A will cause the output at pin 13 to go low and timer U4 ($T_1$) will be reset.

It is to be noted that the circuit just described with respect to FIG. 12 for detecting an arcing condition could be embodied in the more extensive circuit illustrated in FIG. 11. In such event, the latching network would be activated. To perform further seals the circuit would have to be turned off and then back on, as discussed previously.

Junction J4, as shown in FIGS. 11 and 12, attendant pulse width modulator U1 is an option that accommodates remote control of the output power. Variable resistor R23 is adjusted for an average output power. This variable resistor may be positionally modifiable to be operator accessible and accommodate variation of the average output power from a preset value.

In the event it is preferred not to use a pulse width modulator to modify the output power level, the pulse width modulator U1 may be removed. In its place, a variable resistor R19 would be connected intermediate the collector of transistor Q8 and the collector of transistor Q3. This variable resistor would provide a monotonic, sometimes referred to as linear, control in average power output.

I claim:

1. Apparatus for melting and sealing tubing, said apparatus comprising in combination:
    a) a pair of electrically conducting jaws for compressing the tubing, at least one jaw of said pair of jaws being movable to compress the tubing placed intermediate said pair of jaws;
    b) means for generating a radio frequency signal in response to compression of the tubing by said pair of jaws;
    c) means for amplifying the radio frequency signal to a predetermined power level;

d) means for applying the amplified radio frequency signal across said pair of jaws;

e) means for regulating said generating means to selectively apply a predeterminable level of power across said pair of jaws;

f) means for timing and controlling said regulating means as a function of the melting of the tubing; and g) means for preempting said timing and controlling means in the event of a fault.

2. Control apparatus for melting and sealing tubing, said apparatus comprising in combination:

a) a pair of electrically conducting jaws for compressing the tubing, at least one jaw of said pair of jaws being movable to compress the tubing placed intermediate said pair of jaws;

b) means for generating a radio frequency signal;

c) means for applying the radio frequency signal across said pair of jaws;

d) means for regulating said generating means to alter the power applied across said pair of jaws;

e) means for timing and controlling said regulating means in response to the melting of the tubing; and f) means for terminating operation of said timing and controlling means in response to a fault.

3. Control apparatus for welding plastic material, said apparatus comprising in combination:

a) a pair of electrically conducting jaws for compressing the plastic material, at least one jaw of said pair of jaws being movable to compress the plastic material placed between said pair of jaws, which movement varies the impedance across said pair of jaws;

b) means for generating an RF signal;

c) means for transmitting the RF signal across said pair of jaws and through the plastic material placed therebetween to heat and to melt the plastic material;

d) means for controlling said generating means as a function of the impedance across said pair of jaws;

e) means for terminating said generating means in response to a fault; and f) a source of direct current power for energizing said generating means, said transmitting means and said terminating means.

4. Control apparatus for melting and welding plastic material, said apparatus comprising in combination:

a) a pair of electrically conducting jaws for compressing the plastic material at least one jaw of said pair of jaws being movable to compress the plastic material placed between said pair of jaws, which movement varies the impedance across said pair of jaws;

b) means for generating an RF output signal across said pair of jaws to melt the plastic material in response to movement of said pair of jaws to compress the plastic material;

c) means for terminating said generating means as a function of the impedance between said pair of jaws and indicative of a predetermined melting of the plastic material; and d) means for terminating said generating means in response to a fault condition.

5. Control apparatus for melting and sealing tubing, said apparatus comprising in combination:

a) a pair of electrically conducting jaws for compressing the tubing, at least one jaw of said pair of jaws being movable toward and away from the other to compress the tubing between said pair of jaws;

b) means for generating a radio frequency signal in response to compression of the tubing by said pair of jaws;

c) means for amplifying the radio frequency signal;

d) means for applying the amplified radio frequency signal across said pair of jaws;

e) means for regulating said generating means to control the power applied across said pair of jaws;

f) means for timing and controlling said regulating means as a function of a predetermined melting of the tubing; and g) means for terminating said timing and controlling means in response to a fault.

6. Control apparatus for welding plastic material, said apparatus comprising in combination:

a) a pair of electrically conducting jaws for compressing the plastic material, at least one jaw of said pair of jaws being movable to compress the plastic material between said pair of jaws, which movement varies the impedance across said pair of jaws;

b) means for generating an RF signal;

c) means for transmitting the RF signal across said pair of jaws and through the plastic material placed therebetween to heat and to melt the plastic material as a function of the impedance across said pair of jaws;

d) means for terminating said generating means as a function of the impedance across said pair of jaws;

e) further means for terminating said generating means in response to a weld fault; and f) a source of direct current power for energizing said generating means, said transmitting means and said terminating means.

7. Control apparatus for melting and welding plastic material, said apparatus comprising in combination:

a) a pair of electrically conductive jaws for compressing the plastic material, at least one jaw of said pair of jaws being movable to compress the plastic material, which movement varies the impedance across said pair of jaws;

b) means for generating an RF output signal across said pair of jaws to melt the plastic material in response to movement of said pair of jaws to compress the plastic material;

c) means for terminating said generating means as a function of the impedance between said pair of jaws and indicative of a predetermined melting of the plastic material; and d) means for latching said generating means in response to a fault condition.

8. A method for controlling the melting and sealing of tubing, said method comprising the steps of:

a) pair of electrically conducting jaws for compressing the tubing placed therebetween, at least one jaw of said pair of jaws being movable to compress the tubing placed between said pair of jaws;

b) generating a radio frequency signal in response to compression of the tubing by said pair of jaws;

c) applying the radio frequency signal across said pair of jaws;

d) regulating said generating step to control the power applied across said pair of jaws;

e) timing and controlling said regulating step in response to the melting of the tubing; and f) terminating operation of said generating step in response to said timing and controlling steps in response to a fault.

9. A method for controlling the welding of plastic material, said method comprising the steps of:

a) a pair of electrically conducting jaws for compressing the plastic material placed between said pair of jaws, at least one jaw of said pair of jaws being movable to compress the plastic material placed between said pair of jaws;

b) generating an RF signal;

c) transmitting the RF signal across said pair of jaws and through the plastic material placed therebetween to heat and to melt the plastic material as a function of the impedance across said pair of jaws;

d) terminating said generating step as a function of the impedance across said pair of jaws;

e) further terminating said generating step in response to a fault; and f) providing a source of direct current power to energize said generating step, said transmitting step and said terminating step.

10. A method for controlling the melting and welding of plastic material, said method comprising the steps of:

a) placing the plastic material between a pair of electrically conductive jaws;

b) moving at least one jaw of the pair of jaws to compress the plastic material placed therebetween and to vary the impedance across the pair of jaws;

c) generating an RF output signal across the pair of jaws to melt the plastic material placed therebetween in response to movement of the pair of jaws to compress the plastic material;

d) terminating said generating step as a function of the impedance between the pair of jaws and indicative of a predetermined melting of the plastic material; and e) further terminating said generating step in response to a fault.

* * * * *